(12) United States Patent
Berry et al.

(10) Patent No.: US 6,832,208 B1
(45) Date of Patent: Dec. 14, 2004

(54) INVOICE ENTRY

(75) Inventors: Charles F. Berry, Apalachin, NY (US); Cindy L. Crowningshield, Apalachin, NY (US); David C. Marsh, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 09/711,608

(22) Filed: Nov. 13, 2000

(51) Int. Cl.⁷ .............................................. G06F 17/60
(52) U.S. Cl. ........................................... 705/32; 705/9
(58) Field of Search .............................. 705/30, 32, 9

(56) References Cited

U.S. PATENT DOCUMENTS

| | | | | |
|---|---|---|---|---|
| 4,642,767 A | | 2/1987 | Lerner | 364/406 |
| 5,121,945 A | | 6/1992 | Thomson et al. | 283/58 |
| 5,325,291 A | * | 6/1994 | Garrett et al. | 705/4 |
| 5,404,509 A | | 4/1995 | Klein | 395/600 |
| 5,666,490 A | * | 9/1997 | Gillings et al. | 705/1 |
| 5,787,443 A | * | 7/1998 | Palmer | 707/202 |
| 5,812,989 A | | 9/1998 | Witt et al. | 705/45 |
| 5,813,009 A | | 9/1998 | Johnson et al. | 707/100 |
| 5,848,426 A | | 12/1998 | Wang et al. | 707/505 |
| 5,883,957 A | * | 3/1999 | Moline et al. | 705/57 |
| 5,918,216 A | * | 6/1999 | Miksovsky et al. | 705/35 |
| 5,963,925 A | | 10/1999 | Kolling et al. | 705/40 |
| 6,041,312 A | | 3/2000 | Bickerton et al. | 705/30 |
| 6,058,380 A | | 5/2000 | Anderson et al. | 705/40 |
| 6,128,602 A | * | 10/2000 | Northington et al. | 705/35 |
| 6,148,291 A | * | 11/2000 | Radican | 705/28 |
| 6,275,940 B1 | * | 8/2001 | Edwards et al. | 713/200 |
| 6,333,976 B2 | * | 12/2001 | Lesley | 379/114.01 |
| 6,400,997 B1 | * | 6/2002 | Rapp, III | 700/83 |
| 6,542,841 B1 | * | 4/2003 | Snyder | 702/104 |

FOREIGN PATENT DOCUMENTS

| JP | 11134419 | 5/1999 | G06F/19/00 |
|---|---|---|---|
| JP | 11306247 | 11/1999 | G06F/19/00 |

OTHER PUBLICATIONS

"MS Invoice Design and Deployment: Web–Based Invoicing at Microsoft," retrieved Apr. 01, 2000 from www.microsoft.com/technet/showcase/commerce/webbinv.asp.
P. Houghtaling, "IBM's Small Suppliers Reap Big Awards," retrieved Mar. 29, 2000 from www.ecomworld.com/htm/articles/ecw7_3.htm.
"Monitor–The Complete IT Solution for Intermodal Operators," retrieved Apr. 01, 2000 from www.softwaredecisions.com/monitor–2.htm.
S. Fleischer, "Common Sense Guide to Cost Control and Greater Corporate Profits," CPA Journal Online, Apr. 1993.
E. Gibson, "New Software will Streamline University Transactions, " The Daily Nebraskan, Sep. 1997.
"Expense Management Service, TSL Services Inc.," retrieved from www.tsl.com/services/expense_mgt_serv.html.
"Elf eInvoice Why Use eInvoice," retrieved Mar. 31, 2000 from www.elftech.com/prodserv/lawfirm/eWhyUseEInvoice.htm.

* cited by examiner

Primary Examiner—Bryan Jaketic
(74) Attorney, Agent, or Firm—William E. Schiesser; Kevin P. Radigan, Esq.; Heslin Rothenberg Farley & Mesiti P.C.

(57) ABSTRACT

A business process involves manually entering data from an invoice into a first database by a first person. The database includes a status indicator having various states. The invoice entry is audited by a second person who manually enters a subset of the data into the database. The subset is matched with the data entered by the first person and unmatched entries highlighted. The auditor may re-enter only data which he has entered. The invoice is then returned to the first person who may re-enter only data which he has entered or cancel the invoice. After there are no unmatched entries, the first person posts the data to a second database.

19 Claims, 1 Drawing Sheet

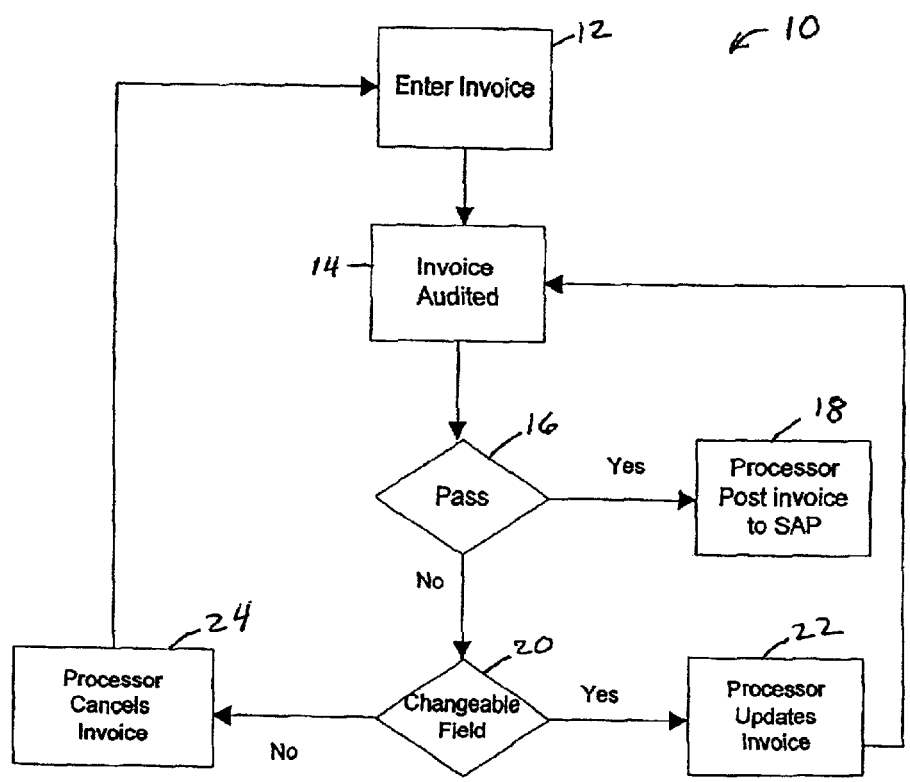

INVOICE ENTRY

TECHNICAL FIELD

This invention relates generally to business methods and apparatus for manually entering invoice data into a procurement or accounts payable database. More specifically the invention relates to detecting and correcting errors when such data is entered into a business process.

BACKGROUND OF THE INVENTION

Procurement of products and services by companies for use within the company or for use in the manufacture of products has been developed and automated to a high degree. The technologies of electronic commerce provide significant advantages when applied to procurement systems. Once a product or service is ordered, and shipped by a supplier, the supplier normally requests payment by sending an invoice to the company which made the purchase.

While many systems have been developed for sending and receiving invoices electronically, a significant number of suppliers and purchasers continue to send and receive hardcopy invoices. Although fax technology is often used, as well as e-mail and conventional postal or courier services, the net is that a hardcopy invoice or equivalent image must be manually entered into the purchaser's procurement or accounts payable system. Where a large number of invoices must be entered manually, errors are inevitable. Accordingly, methods and apparatus for entering invoices while minimizing or eliminating errors are desired.

K. Yukihiro in Japanese patent 11134419 describes a bill correction device for updating information in a stored electronic bill, based on comparison between an input bill and the stored bill. A correction unit updates the stored bill. Checking work is significantly reduced by judging from the number of times of correction whether the content of the two bills are the same.

T. Setsuo in Japanese patent 11306247 describes an accounting processing system which deals with errors on slips. By totalizing a result, a computer detects errors. The computer also produces correction data and a slip to be added for elimination of the error.

In an article entitled "MS Invoice Technical Design and Deployment," there is described a web-based invoicing application enabling suppliers to electronically submit invoices directly into a company's SAP R/3 enterprise resource application.

P. Houghtaling in an article titled "IBM's Small Suppliers Reap Big Rewards," describes a web site to post customized business forms for use by suppliers. The suppliers send invoices electronically using the forms thereby eliminating manual data entry.

A document of the monitor application titled "monitor—The complete IT solution for Intermodal Operators," describes how manual checking is replaced by automatic invoice checking facilities using a job's dispatch plan. This insures invoices do not duplicate previous payment requests.

A document of the ELF eInvoice application discloses a system for automating the manual review of legal invoices.

Despite the above-described developments, there remains a need for reducing errors in systems which manually enter invoices. In accordance with the teachings of the present invention there is defined a new process for entering invoices while reducing the number of errors involved. It is believed that such a process would constitute a significant advancement in the art.

OBJECTS AND SUMMARY OF THE INVENTION

It is therefore a principal object of the present invention to enhance the invoice entry art by providing a process for invoice entry with enhanced auditing capabilities.

It is another object to provide such a process wherein enhanced operational capabilities are possible.

These and other objects are attained in accordance with one embodiment of the invention wherein there is provided a method of invoice entry, comprising the steps of, entering data from an invoice, by a first person, into a first database having a status indicator associated with the data from the invoice, and setting the status indicator to entered, entering a subset of the data from the invoice, by a second person different from the first person, into the database, matching the subset of the data entered by the second person with the data entered by the first person and highlighting any unmatched entries, either re-entering the unmatched entries by the second person and changing the status indicator to audit passed, or setting the status indicator to audit failed, or setting the status indicator to audit passed if there are no unmatched entries, and either posting the entered invoice data by the first person, to a second database, if the status indicator is audit passed, or re-entering the unmatched entries by the first person, changing the status indicator to re-entered and thereafter proceeding to the matching step, or changing the status indicator, by the first person to cancel.

In accordance with another embodiment of the invention there is provided an invoice entry system, comprising, means for entering data from an invoice, by a first person, into a first database having a status indicator associated with the data from the invoice, and setting the status indicator to entered, means for entering a subset of the data from the invoice, by a second person different from the first person, into the database, means for matching the subset of the data entered by the second person with said data entered by the first person and highlighting any unmatched entries, means for either re-entering the unmatched entries by the second person and changing the status indicator to audit passed, or setting the status indicator to audit failed, or setting the status indicator to audit passed if there are no unmatched entries, and means for either posting the entered invoice data by the first person, to a second database, if the status indicator is audit passed, or re-entering the unmatched entries by the first person, changing the status indicator to re-entered and thereafter proceeding to the matching step, or changing the status indicator, by the first person to cancel.

BRIEF DESCRIPTION OF THE DRAWING

The FIGURE is a flowchart showing an embodiment of the present invention.

BEST MODE FOR CARRYING OUT THE INVENTION

For a better understanding of the present invention, together with other and further objects, advantages, and capabilities thereof, reference is made to the following disclosure and appended claims in connection with the above described drawing.

In the FIGURE there is shown a flowchart 10 of an invoice entry method in accordance with one embodiment of the present invention. Starting at step 12 a first person who is a natural human person in contrast to a robot or computer program or other artificial intelligent being, enters data from an invoice into a first database (not shown). The invoice may be received from a supplier of a product or service who desires payment for the good or service delivered. The invoice may be a hardcopy document or it may be a scanned image of a hardcopy document which can be displayed on a computer monitor or other type for display for viewing such an image. The invoice may also be a softcopy of a document such as a word processor file which can be printed as a hardcopy document or viewed on a computer monitor using word processor software. The first person reads data from the invoice and enters the data into a first database. Entry may be done after reading the data using a keyboard attached to a computer processor having access to the first database. Other entry devices known in the art may also be used such as but not limited to pointing devices or touch sensitive devices. Any number of data items may be entered from the invoice. Depending on the type of database, the data items may be entered into fields. For example, fields may have specific meaning or identifications such as document number, invoice number, invoice date, purchase order number, baseline date, amount, terms, or vendor number.

The database may be any type of database such as but not limited to a spreadsheet database, a relational database, a sequential database, or a hierarchical database. The database has a status indicator associated with the data from the invoice. The status indicator may be any type of indicator including a separate field. The status indicator can be set to various indications of status such as "entered", "audit passed", "audit failed", "re-entered", or "cancel". For each status indication an age e.g. days may be specified. If an age is specified, then any invoice with that particular status indication will be deleted if the invoice has been at the same status indication for the specified number of days or longer. The status indicator may also include a push button which can be activated to specify a reason for the status. For example activating the push button may display a list of reasons from which one of the reasons may be selected. The push button may also activate a reason field where a reason may be entered.

In step 14 a second person also a natural human person, different from the first person audits the invoice entered in step 12. The second person enters a subset of the data from the invoice into the database using any of the techniques and apparatus described above. The second person may also enter a user identification for providing an audit trail of who performed the audit. The audit may include other business controls for auditing business data which are known in the art.

In step 16, the subset of data entered by the second person is matched with the data entered by the first person. Any unmatched entries are highlighted. Examples of highlighting include display of the unmatched entries on a computer screen in a different color e.g. red, reverse video, flashing, sound, or other methods of indicating a difference or calling attention to an unmatched entry. All unmatched entries may be grouped together into a failed work queue and sent to the first person. It is also possible that the first person has inadvertently entered data from an invoice more than once. Matching step 16 can detect the presence of multiple copies of such data and highlight the multiple entries as unmatched. If there are no unmatched entries the status indicator is set to audit passed and the invoice data is posted by the first person to a second database in step 18. The audit passed invoice may be sent to a pass work queue and sent to the first person prior to posting to the second database. The second database may be any type of database such as described above. It may also be a database which is part of a procurement application such as the currently available SAP™ procurement application. (SAP is a trademark of SAP AG, Waldorf, Germany)

In step 20 the second person determines whether the unmatched entry can be changed and if so, re-enters the unmatched entry in step 22 and changes the status indicator to audit passed, after which the invoice entry method returns to step 14. For example, this re-entry would be appropriate for the case where the second person (the auditor) determines that the auditor had made an incorrect entry. If the second person can not change the entry, then the status indicator is set to audit failed in step 24 and the invoice is returned to the first person. A reason may be specified for the failure as described above.

The first person then either cancels the invoice in step 24 and changes the status indicator to cancel or else the first person re-enters the unmatched entries in step 12 and changes the status indicator to re-entered. The invoice will then proceed to step 14 for auditing as explained above. A canceled invoice may be returned to the supplier.

In another embodiment of the present invention, a system for invoice entry includes means for entering data and a subset of the data into a database. Such means may be a computer processor running a database application. The processor may also have various entry devices such as keyboard, pointing device, touch screen or other entry device. The database application may be a unique database application such as a spreadsheet application or relational database application. It may also be an application having other functions which includes a database such as a procurement application having a database.

The system for invoice entry also includes means for matching the subset of data with the data entered by the first person and highlighting any unmatched entries. Such means may be software included in the database application or may comprise a separate application running on the processor running the database application or running on another processor.

The system for invoice entry also includes means for posting entered data to a second database. Such means include any software application capable of moving or copying data from one database to another under control of the first person.

The present invention may also be embodied as a computer program product for instructing a processor to enter invoices. The computer program product includes a computer readable medium such as a CD Rom disk, a floppy disk, zip disk, or other medium known in the art for storing software. Recorded on the medium are program instruction means for providing steps as described above.

While there have been shown and described what are at present considered the preferred embodiments of the invention, it will be obvious to those skilled in the art that various changes and modifications may be made therein without departing from the scope of the invention as defined by the appended claims.

What is claimed is:

1. A method of invoice entry, comprising the steps of:

entering data from an invoice, by a first person, into a first database having a status indicator associated with said data from said invoice, and setting said status indicator to entered;

entering a subset of said data from said invoice, by a second person different from said first person, into said first database to insure accuracy of the data entered into the first database by the first person from the invoice;

matching said subset of said data entered by said second person with said data entered by said first person and highlighting any unmatched entries;

either re-entering said unmatched entries by said second person and changing said status indicator to audit passed, or setting said status indicator to audit failed, or setting said status indicator to audit passed if there are no unmatched entries;

either posting said entered invoice data by said first person, to a second database, if said status indicator is audit passed, or re-entering said unmatched entries by said first person, changing said status indicator to re-entered and thereafter proceeding to said matching step, or changing said status indicator, by said first person to cancel; and tracking a length of time that said status indicator has each at least one of said entered setting, said audit passed setting, said audit failed setting, and said re-entered setting, wherein said length of time is employed to audit said invoice entry.

2. The method of claim 1, wherein said data from said invoice is entered by said first person into a plurality of fields.

3. The method of claim 1, wherein said subset of said data from said invoice is entered by said second person into a plurality of fields.

4. The method of claim 1, wherein said data from said invoice is entered into a plurality of fields and said fields are selected from the group consisting of document number, invoice number, invoice date, purchase order number, baseline date, amount, terms, and vendor number.

5. The method of claim 1, wherein said setting said status indicator to audit failed further comprises specifying a reason.

6. The method of claim 5, wherein said specifying a reason further comprises selecting a specify reason push button.

7. The method of claim 1, further comprising entering a user identification by said second person for providing an audit trail.

8. The method of claim 1, further comprising deleting entered invoice data from this first database if the length of time that the status indicator has a particular setting exceeds a defined threshold, wherein the particular setting comprises one of said entered setting, said audit passed setting, said audit failed setting, and said re-entered setting.

9. The method of claim 1, wherein the second database is part of a procurement application, the procurement application comprising an SAP procurement application.

10. An invoice entry system, comprising:
    means for entering data from an invoice, by a first person, into a first database having a status indicator associated with said data from said invoice, and setting said status indicator to entered;
    means for entering a subset of said data from said invoice, by a second person different from said first person, into said first database to insure accuracy of the data entered into the first database by the first person from the invoice;
    means for matching said subset of said data entered by said second person with said data entered by said first person and highlighting any unmatched entries;
    means for either re-entering said unmatched entries by said second person and changing said status indicator to audit passed, or setting said status indicator to audit failed, or setting said status indicator to audit passed if there are no unmatched entries;
    means for either posting said entered invoice data by said first person, to a second database, if said status indicator is audit passed, or re-entering said unmatched entries by said first person, changing said status indicator to re-entered and thereafter proceeding to said matching step, or changing said status indicator, by said first person to cancel; and
    tracking a length of time that said status indicator has each of said entered setting, said audit passed setting, said audit failed setting, and said re-entered setting, wherein said length of time is employed to audit said invoice entry.

11. The system of claim 10, wherein said means for entering data from said invoice further comprises means for entering said data into a plurality of fields.

12. The system of claim 10, wherein said means for entering said subset of said data from said invoice further comprises means for entering said subset of said data into a plurality of fields.

13. The system of claim 12, wherein said fields are selected from the group consisting of document number, invoice number, invoice date, purchase order number, baseline date, amount, terms, and vendor number.

14. The system of claim 10, wherein said means for setting said status indicator to audit failed further comprises means for specifying a reason.

15. The system of claim 14, further comprising a specify reason push button.

16. The system of claim 10, further comprising means for entering a user identification by said second person for providing an audit trail.

17. The system of claim 10, further comprising means for deleting entered invoice data from the first database if the length of time that the status indicator has a particular setting exceeds a defined threshold, wherein the particular setting comprises one of said entered setting, said audit passed setting, said audit failed setting, and said re-entered setting.

18. The system of claim 10, wherein the second database is part of a procurement application, the procurement application comprising an SAP procurement application.

19. A computer program product for instructing a processor to enter invoices, said computer program product comprising:
    a computer readable medium;
    first program instruction means for entering data from an invoice, by a first person, into a first database having a status indicator associated with said data from said invoice, and setting said status indicator to entered;
    second program instruction means for entering a subset of said data from said invoice, by a second person different from said first person, into said first database to insure accuracy of the data entered into the first database by the first person from the invoice;
    third program instruction means for matching said subset of said data entered by said second person with said data entered by said first person and highlighting any unmatched entries;
    fourth program instruction means for either re-entering said unmatched entries by said second person and changing said status indicator to audit passed, or setting said status indicator to audit failed, or setting said status indicator to audit passed if there are no unmatched entries;
    fifth program instruction means for either posting said entered invoice data by said first person, to a second database, if said status indicator is audit passed, or re-entering said unmatched entries by said first person, changing said status indicator to re-entered and thereafter proceeding to said matching step, or changing said status indicator, by said first person to cancel;
    sixth program instruction means for tracking a length of time that said status indicator has each of said entered setting, said audit passed setting, said audit failed setting, and said re-entered setting, wherein said length of time is employed to audit said invoice entry; and wherein
    all said program instruction means are recorded on said medium.

* * * * *